United States Patent
Abe et al.

(10) Patent No.: US 12,337,782 B2
(45) Date of Patent: Jun. 24, 2025

(54) AIRBAG DEVICE

(71) Applicant: Autoliv Development AB, Vargarda (SE)

(72) Inventors: Kazuhiro Abe, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 34 days.

(21) Appl. No.: 18/255,271

(22) PCT Filed: Dec. 22, 2021

(86) PCT No.: PCT/JP2021/047645
§ 371 (c)(1),
(2) Date: May 31, 2023

(87) PCT Pub. No.: WO2022/138741
PCT Pub. Date: Jun. 30, 2022

(65) Prior Publication Data
US 2024/0025368 A1 Jan. 25, 2024

(30) Foreign Application Priority Data
Dec. 23, 2020 (JP) .................................. 2020-213278

(51) Int. Cl.
*B60R 21/203* (2006.01)
*B60R 21/00* (2006.01)
*B60R 21/2338* (2011.01)

(52) U.S. Cl.
CPC ........ *B60R 21/203* (2013.01); *B60R 21/2338* (2013.01); *B60R 2021/0048* (2013.01); *B60R 2021/23382* (2013.01)

(58) Field of Classification Search
CPC .............. B60R 21/203; B60R 21/2338; B60R 2021/23382
See application file for complete search history.

(56) References Cited

U.S. PATENT DOCUMENTS 8,899,618 B2 * 12/2014 Eckert ................. B60R 21/2338
280/743.2
11,370,378 B2 * 6/2022 Hotta .................. B60R 21/2338
(Continued)

FOREIGN PATENT DOCUMENTS

JP 2018-20737 A 2/2018
JP 2018-167681 A 11/2018
(Continued)

OTHER PUBLICATIONS

WO-2019235145-A1 (machine translation) (Year: 2019).*
(Continued)

*Primary Examiner* — Jason D Shanske
*Assistant Examiner* — Joselynn Y Sliteris
(74) *Attorney, Agent, or Firm* — Foley & Lardner LLP

(57) ABSTRACT

An airbag device installed in a steering wheel of a vehicle and includes: a gas generator that is secured to the steering wheel and generates expansion gas; and an airbag cushion that is expanded and deployed by the expansion gas toward the occupant side. The airbag cushion includes an occupant side panel that faces an occupant when expanded and deployed, a steering side panel that is opposite the occupant side panel, and a side panel that connects both panels at the outer edge of the occupant side panel and the steering side panel. A recessed part is formed near the center of the occupant side panel with the airbag cushion in an expanded and deployed state. A substantially flat part that comes into contact with the face of the occupant is formed in an area above the recessed part of the occupant side panel.

11 Claims, 8 Drawing Sheets

(56) References Cited

U.S. PATENT DOCUMENTS

| | | | | |
|---|---|---|---|---|
| 11,453,357 | B2* | 9/2022 | Morita | B60R 21/203 |
| 11,623,596 | B2* | 4/2023 | Honma | B60R 21/237 |
| | | | | 280/731 |
| 11,752,964 | B2* | 9/2023 | Morita | B60R 21/21656 |
| | | | | 280/729 |
| 11,932,189 | B2* | 3/2024 | Morita | B60R 21/231 |
| 2004/0119271 | A1 | 6/2004 | Webber | |
| 2013/0181429 | A1* | 7/2013 | Weng | B60R 21/203 |
| | | | | 280/731 |
| 2018/0281731 | A1* | 10/2018 | Hotta | B60R 21/2338 |
| 2022/0306037 | A1* | 9/2022 | Suzuki | B60R 21/2035 |
| 2023/0415691 | A1* | 12/2023 | Morita | B60R 21/231 |

FOREIGN PATENT DOCUMENTS

| | | | | |
|---|---|---|---|---|
| JP | 2019-142338 A | | 8/2019 | |
| JP | 2019/235145 A1 | | 12/2019 | |
| JP | 2020-37382 A | | 3/2020 | |
| JP | 2020142607 A | * | 9/2020 | |
| JP | 2020-164000 A | | 10/2020 | |
| WO | WO-2019235145 A1 | * | 12/2019 | ........... B60R 21/203 |
| WO | WO-2020035994 A1 | * | 2/2020 | ........... B60R 21/203 |
| WO | WO-2020217824 A1 | * | 10/2020 | ........... B60R 21/203 |

OTHER PUBLICATIONS

JP-2020142607-A (machine translation) (Year: 2020).*
WO-2020217824-A1 (machine translation) (Year: 2020).*
WO-2020035994-A1 (machine translation) (Year: 2020).*

* cited by examiner

AIRBAG DEVICE

TECHNICAL FIELD

The present invention relates to driver airbag device stowed in a steering wheel of a vehicle.

BACKGROUND TECHNOLOGY

Providing a vehicle with one or a plurality of airbag devices in order to protect an occupant therein in the event of a vehicle accident is well known. There are various forms of airbag devices, such as so-called driver airbag devices that deploy from near the center of a steering wheel to protect a driver, curtain airbags that deploy downward inside a window to protect an occupant in the event of a lateral impact, rollover, or overturning accident, side airbags that are deployed to a side of an occupant (side of a seat) to protect the occupant in the event of a lateral impact of the vehicle, and the like.

With the driver airbag device stowed in the steering wheel, an airbag cushion is required to quickly deploy to reliably restrain an occupant. Furthermore, deployment shape and deployment orientation stability of the airbag cushion is important for improving restraint performance of the occupant.

Some airbag cushions used in driver airbag devices are formed by sewing together the outer edges of two generally circular (elliptical) panels. In this manner of panel structure, the structure of the airbag cushion is simplified, and the manufacturing cost can be reduced. However, the inflated/deployed airbag cushion assumes a shape close to a sphere due to the dispersion of internal pressure. Therefore, the head of the occupant (driver) comes into contact with a curved airbag cushion causing the head to rotate and causing difficulty in appropriately protecting the occupant (head).

The airbag device according to Patent Document 1 utilizes an airbag cushion having a truncated cone shape in an expanded and deployed state by means of an occupant side panel, a steering side panel, and a side panel that connects these panels. With this manner of structure, "the surface facing the occupant can be made flat in an expansion complete state." However, as internal pressure of the airbag cushion increases, in actuality, the panel on the occupant side panel curves, readily causing the head of the occupant to rotate upon contact and sufficient improvement in restraint performance was not feasible.

PRIOR ART DOCUMENTS

Patent Documents

[Patent Document 1] Japanese Unexamined Patent Application 2018-20737

SUMMARY OF THE INVENTION

Problem to be Solved by the Invention

In light of the circumstances described above, an object of the present invention is to provide an airbag device with superior restraint performance for the head of the occupant.

Means for Solving the Problems

To achieve the object described above, the present invention is an airbag device installed in a steering wheel of a vehicle and includes:

a gas generator that is secured to the steering wheel and generates expansion gas; and an airbag cushion that is expanded and deployed by the expansion gas toward the occupant side. The airbag cushion includes an occupant side panel that faces an occupant when expanded and deployed, a steering side panel that is opposite the occupant side panel, and a side panel that connects both panels at the outer edge of the occupant side panel and the steering side panel. A recessed part is formed near the center of the occupant side panel with the airbag cushion in an expanded and deployed state. A substantially flat part that comes into contact with the face of the occupant is formed in an area above the recessed part of the occupant side panel.

Here, the "area that comes into contact with the face of the occupant" can be defined to be the area that comes into contact with the face when a point Ox that vertically intersects with a straight line Lx extending in the direction of the face from the center of gravity Xa of the head of a THOR dummy AM50 used in vehicle crash testing comes into contact with the occupant side panel of the expanded and deployed airbag cushion.

In the EURO NCAP MPDB test, a "vehicle crash test" can be assumed to be a test of crashing a vehicle at a speed of 50 km into a 1400 kg aluminum honeycomb with a 50% overlap. In addition, the THOR AM50 specified in ENCAP, for example, can be applied as the dummy used for this test.

In addition, the "substantially flat part" is not limited to being perfectly flat but includes slight curvature being permitted as long as the entire face of the occupant comes into contact with the expanded and deployed airbag cushion at substantially the same time. "Substantially at the same time" can be taken to mean a range of 0 to 5 ms, and the greatest effect is achieved if within this range.

The airbag cushion according to the present invention is formed by connecting the occupant side panel, the steering side panel, and the side panel, and compared to the case of connecting the occupant side panel and the steering side panel directly, the occupant side panel has less curve (greater degree of curvature), and is closer to being a flat surface.

In addition, by forming the recessed part near the center of the occupant side panel, the periphery of the recessed part of the occupant side panel is less curved (greater degree of curvature) and the surface of the occupant side panel is even closer to being a flat surface.

Furthermore, by forming a substantially flat part above the recessed part of the occupant side panel in the area that the face of the occupant comes into contact with, the actual surface area that is in contact with the head (face) of the occupant increases, suppressing rotation of the head of the occupant upon entering into the airbag cushion, and enabling reliably restraining the head of the occupant. As a result, brain injuries to the occupant can be reduced.

When the expanded and deployed airbag cushion is viewed from the side, the line LB connecting the upper end and the lower end of the flat part and the line LA connecting the upper end and the lower end of the face of the occupant can be configured to be substantially parallel.

Here, "substantially parallel" means that the two lines LB and LA are parallel or diverge within ±10° of parallel and that experimentally, if the divergence is ±10° or higher, the effect of the present invention will be reduced.

The flat part can be formed so that the entirety of the flat portion of the face of the THOR dummy AM50 used during a vehicle crash test comes into contact at the same time.

Here, "at the same time" can be taken to mean a range of 0 to 5 ms and the greatest effect is achieved if within this range.

When the steering wheel is viewed from the side, the surface of the rim can be configured to tilt forward 15° to 30° with respect to vertical. The steering wheel in a typical sedan, SUV, or the like is generally tilted to the front in a range of 15° to 30°. The present invention does not take into consideration large trucks or specialized vehicles where the steering wheel is tilted nearly horizontal. Note that "vertical" means vertical relative to a structural part horizontally arranged such as a vehicle chassis and corresponds to "plumb" when the vehicle is parked on a horizontal road surface.

When viewed from the side, a line LB connecting the upper end and the lower end of the flat part of the airbag in a deployed state is preferably inclined 0° to 30° in the direction of approaching the head of the occupant relative to a line LS parallel to the steering wheel rim surface.

As described above, steering wheels are attached in a state of being tilted forward with respect to vertical in a typical vehicle. The airbag deploys in a direction roughly perpendicular relative to the steering wheel rim surface. Here, inclining the occupant side panel in the direction approaching the head of the occupant enables setting the flat part of the occupant side panel in a state closer to vertical (upright). As a result, the head (face) of the occupant comes into contact with the flat part of the airbag over a larger surface area.

A tether extending in the front-to-back direction is provided inside the airbag cushion that connects the steering side panel and the occupant side panel, and the inclination of the flat part can be adjusted by the length of the tether in the front-to-back direction.

A recessed part near the center of the occupant side panel can be formed by setting the length of the tether in the front-to-back direction smaller than the width of the side panel. The shorter the length of the tether, the deeper the recessed part, resulting in higher inclination of the flat part formed in the upper part of the occupant side panel in the direction of tilting to the occupant side relative to vertical.

The side panel can be formed so that a width D2 of the portion connected to the upper end (12 o'clock position) of the expanded and deployed airbag cushion in the front-to-back direction is wider than a width D1 of the portion connected to the lower end (6 o'clock position).

In this manner, enlarging the width of the upper end part more than the width of the lower end part of the side panel causes the upper part (12 o'clock side) of the occupant side panel of the expanded and deployed airbag cushion to be inclined toward the occupant. Here, a surface on the occupant side of the airbag cushion was inclined away from the occupant X (toward the front of the vehicle) by roughly 30° to 60° but inclining the occupant side panel toward the occupant enables the flat part of the occupant side panel to be close to vertical, increasing the contact surface area with the face of the occupant.

The side panel can be formed as a single elongated panel and both ends of this panel can be connected together at the upper end (12 o'clock position) of the airbag cushion.

The center position C1 in the vertical direction of the recessed part can be configured in a position higher than the center position C0 in the vertical direction of the occupant side panel.

By offsetting (eccentrically), the recessed part to the upper part of the occupant side panel, the proportion of the lower area of the airbag cushion increases, enabling reliable restraint of the abdomen of the occupant and avoiding an incident of the abdomen of the occupant colliding with the steering wheel.

The expanded and deployed airbag cushion can be configured so that when the head of the occupant comes into contact with the occupant side panel, the upper end part of the recessed part is positioned near the jaw of the occupant.

In this manner, adopting a structure with the upper end of the recessed part positioned near the jaw of the occupant enables the flat part that is above the recessed part of the occupant side panel to cover the entire facial surface of the occupant.

A horizontal (lateral direction) distance D3 from a left-right end part in the center in the vertical direction of the recessed part to a left-right end part of the occupant panel can be set substantially equal to a vertical (longitudinal direction) distance D4 from an up-down end part in the center in the left-right direction of the recessed part to an up-down end part of the occupant panel. In other words, the outer peripheral shape of the recessed part as viewed from the occupant side can be set similar to the outer peripheral shape of the occupant side panel.

By arranging the recessed part in the center of the occupant side panel in this manner, gas spreads uniformly inside the airbag cushion enabling a stabilized deployment shape and deployment behavior of the airbag cushion.

The recessed part is formed by a tether that extends in the front-to-back direction inside the airbag cushion and connects the steering side panel and the occupant side panel.

The tether can be connected along a circular or elliptic shape sewing line in the center of the occupant side panel.

MODE FOR CARRYING OUT THE INVENTION

The airbag device according to the present invention will be described with reference to the accompanying drawings. In the description below, when an occupant is seated in a seat in a normal posture, the direction the occupant faces is referred to as the "front," the opposite direction is referred to as the "back," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

Note that as described above, the 12 o'clock, 3 o'clock, 6 o'clock, and 9 o'clock directions are positions when the steering wheel is regarded as a clock face, but the direction of the steering wheel when the vehicle is traveling straight is the standard, where upward or direction of travel is 12 o'clock. Based on the 12 o'clock position when the driver looks forward, a position rotated clockwise by 90 degrees is 3 o'clock, a position rotated by 180 degrees is 6 o'clock, and a position rotated by 270 degrees is 9 o'clock.

Figure 1:
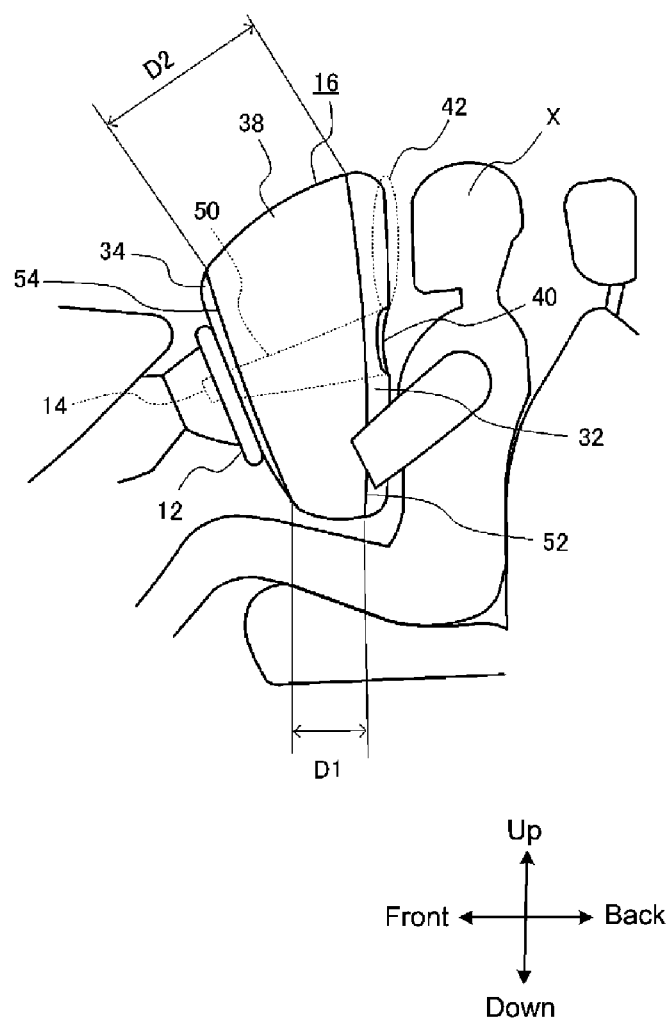
FIG. 1 is a side view illustrating how the airbag device according to the present invention is activated and an airbag cushion has expanded and deployed.
Figure 3:
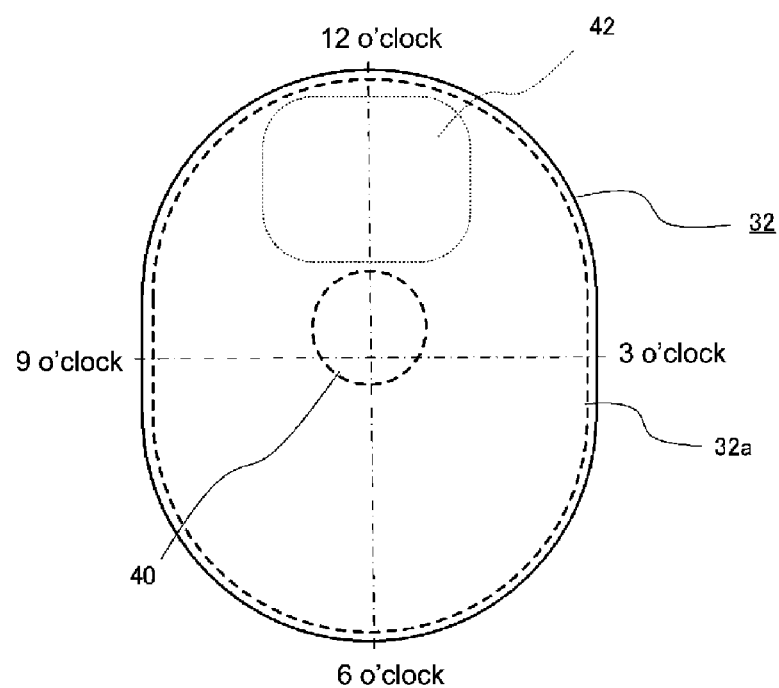
FIG. 3 is a front view illustrating an occupant side panel of a deployed airbag cushion for the airbag device according to the present invention.
Figure 4:
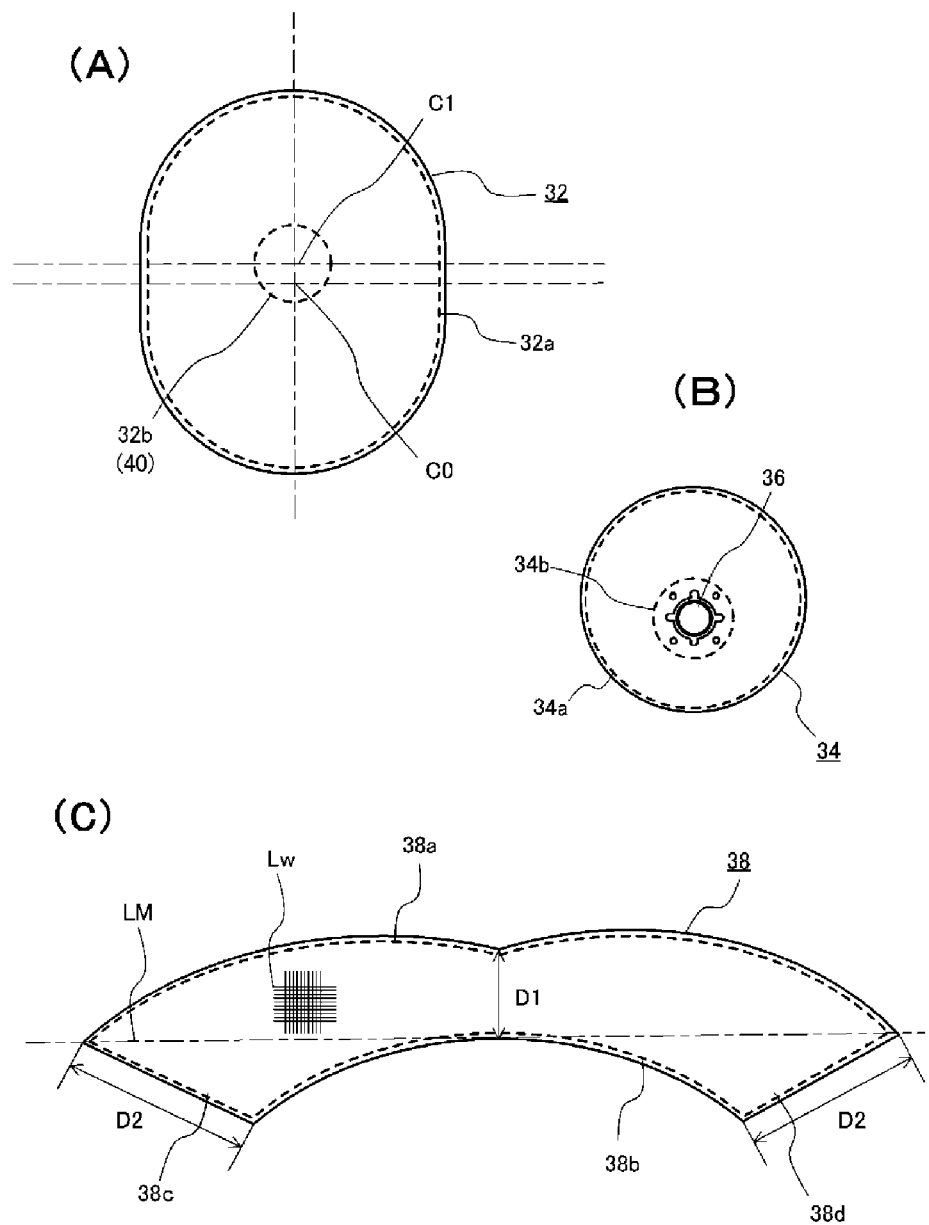
FIG. 4 is a plan view illustrating a panel configuration of the airbag cushion for the airbag device according to the present invention.

FIG. 1 is a side view illustrating a state immediately after the airbag device according to the present invention is activated and an airbag cushion 16 has expanded and deployed. FIG. 2(A) is a side view illustrating the positional relationship of a deployed airbag cushion 16 and the occupant (dummy). FIG. 2B is a side view illustrating the position of the center of gravity of the head of the dummy. FIG. 3 is a front view illustrating an occupant side panel 32 of a deployed airbag cushion 16. FIG. 4 is a plan view illustrating a panel configuration of the airbag cushion 16.

The present invention is an airbag device installed in a steering wheel 12 of a vehicle and includes:
  a gas generator 14 that is secured to the steering wheel 12 and generates expansion gas; and
  an airbag cushion 16 that is expanded and deployed by the expansion gas toward the occupant X side.

The airbag cushion 16 includes an occupant side panel 32 that faces the occupant X when expanded and deployed, a steering side panel 34 that is opposite the occupant side panel, and a side panel 38 that connects both panels (32, 34) at the outer edge of the occupant side panel 32 and the steering side panel 34.

A recessed part 40 is formed near the center of the occupant side panel 32 with the airbag cushion 16 in an expanded and deployed state. A substantially flat part 42 is formed at the upper part of the recessed part 40 of the occupant side panel 32 in the area the face of occupant X comes into contact with.

The "substantially flat part" is not limited to an area that is perfectly flat but is an area where slight curvature is permitted as long as the entire face of the occupant X comes into contact with the expanded and deployed airbag cushion 16 at substantially the same time.

As illustrated in FIG. 2(B), the area that comes into contact with the face of the occupant X can be defined to be the area that comes into contact with the face when a point Ox that orthogonally intersects with a straight line Lx extending in the direction of the face from the center of gravity Xa of the head of a THOR dummy AM50 used in vehicle crash testing comes into contact with the occupant side panel 32 of the expanded and deployed airbag cushion 16.

Note that in the EURO NCAP MPDB test, a "vehicle crash test" can be assumed to be a test of crashing a vehicle at a speed of 50 km into 1400 kg aluminum honeycomb with a 50% overlap. In addition, the THOR AM50 specified in ENCAP can be applied as the dummy used for this test.

As illustrated in FIG. 2(B), brain injury of the occupant can be measured based on rotation (angular speed of the head) centered on the center of gravity position Xa of the head of dummy X and with the present invention, favorable results can be obtained from this manner of test. In other words, brain injury caused by sudden forward rotation of the head of the occupant can be reduced.

Figure 2:
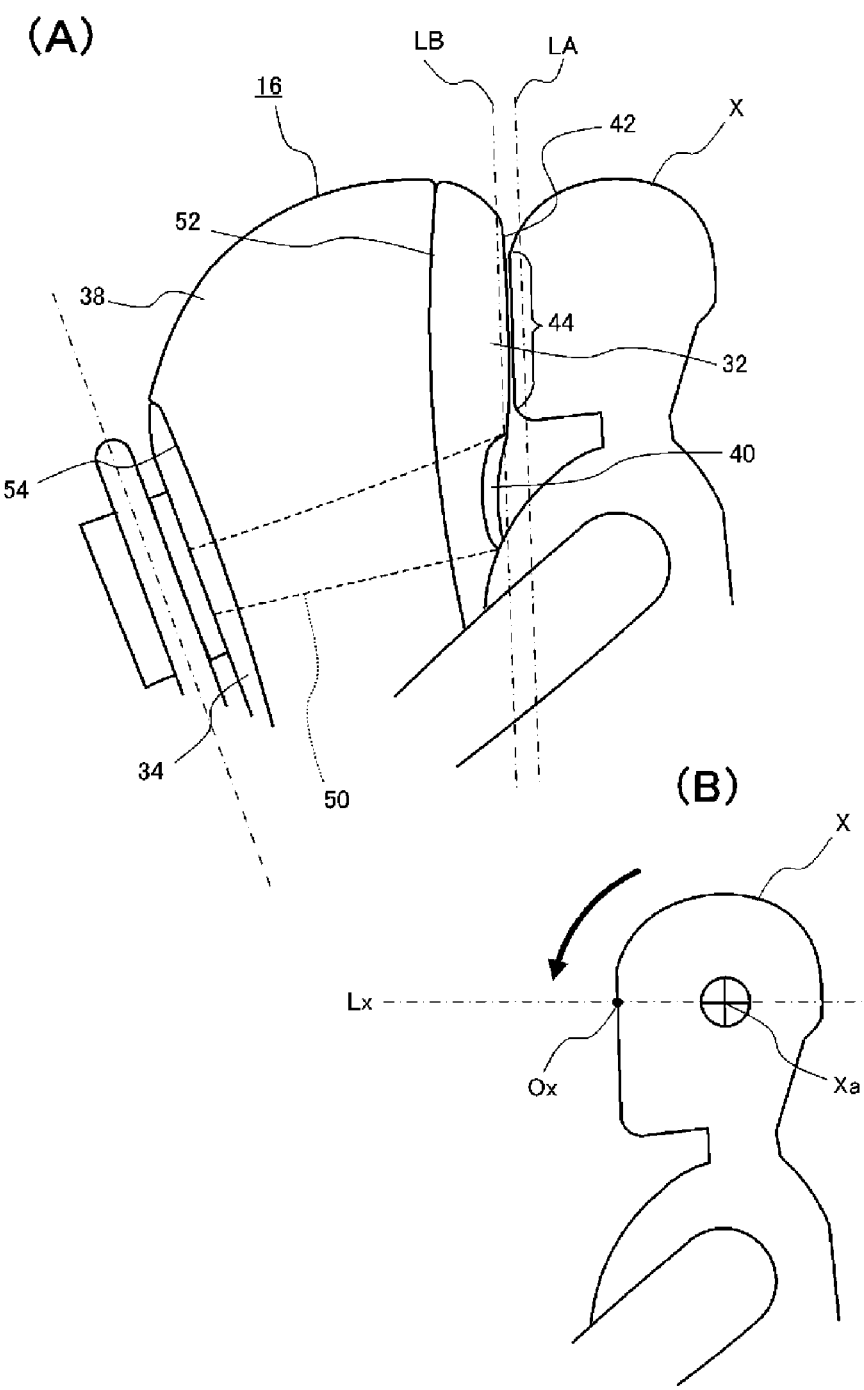
FIG. 2(A) is a side view illustrating the positional relationship of a deployed airbag cushion and an occupant (dummy) for the airbag device according to the present invention.
FIG. 2B is a side view illustrating the position of the center of gravity of the head of the dummy.

As illustrated in FIG. 1 and FIG. 2, when the expanded and deployed airbag cushion 16 is viewed from the side, the line LB connecting the upper end and the lower end of the flat part 42 and the line LA connecting the upper end and the lower end of the face of the occupant X are substantially parallel. Here, "substantially parallel" means that the two lines LB and LA are parallel or diverge within ±10° of parallel and that experimentally, if the divergence is ±10° or higher, the effect of the present invention will be reduced.

As illustrated in FIG. 2, the flat part 42 is configured so as to come into contact with the entirety of the flat portion 44 of the face of the occupant dummy X used for the vehicle crash test at the same time. Here, "at the same time" can be taken to mean a range of 0 to 5 ms and the greatest effect is achieved if within this range.

As illustrated in FIG. 2 and FIG. 4(C), the side panel 16 is formed so that a width D2 of the portion connected to the upper end (12 o'clock position) of the expanded and deployed airbag cushion 16 in the front-to-back direction is wider than a width D1 of the portion connected to the lower end (6 o'clock position).

The upper end part of the recessed part 40 formed on the occupant side panel 32 is positioned near the jaw of the occupant during the vehicle crash test. In this manner, adopting a structure with the upper end of the recessed part 40 positioned near the jaw of the occupant enables the flat part 42 that is above the recessed part 40 of the occupant side panel 32 to cover the entire facial surface of the occupant X.

As illustrated in FIGS. 4(A), (B), and (C), the airbag cushion 16 is composed of the elliptical shaped or circular shaped occupant side panel 32, the steering side panel 34, and the side panel 38. Both ends 38c and 38d of the side panel 38 are connected at the 12 o'clock position of the deployed airbag cushion 16 (see FIG. 3).

In addition to FIG. 4, with reference to FIG. 1 and FIG. 2 again, when the airbag cushion 16 is formed by sewing, a sewing line 52 is formed by connecting (sewing) a peripheral line 32a of the occupant side panel 32 and the outer line 38a of the side panel 38. In addition, a sewing line 54 is formed by connecting a peripheral line 34a of the steering side panel 34 with an inside line 38b of the side panel 38. Furthermore, both ends 38c and 38d of the side panel 38 are connected (sewn). Note that code 36 illustrated in FIG. 4(B) indicates a hole for securing the gas generator 14.

The side panel 38 is formed as a single elongated panel and both ends of this panel 38 are connected together at the upper end (12 o'clock position) of the airbag cushion 16. In addition, the side panel 38 can be formed by cutting the base cloth such that the direction of the maximum length LM in the longitudinal direction of the panel 38 is parallel to the direction Lw in which the weft of the base cloth (60) extends.

Figure 5:
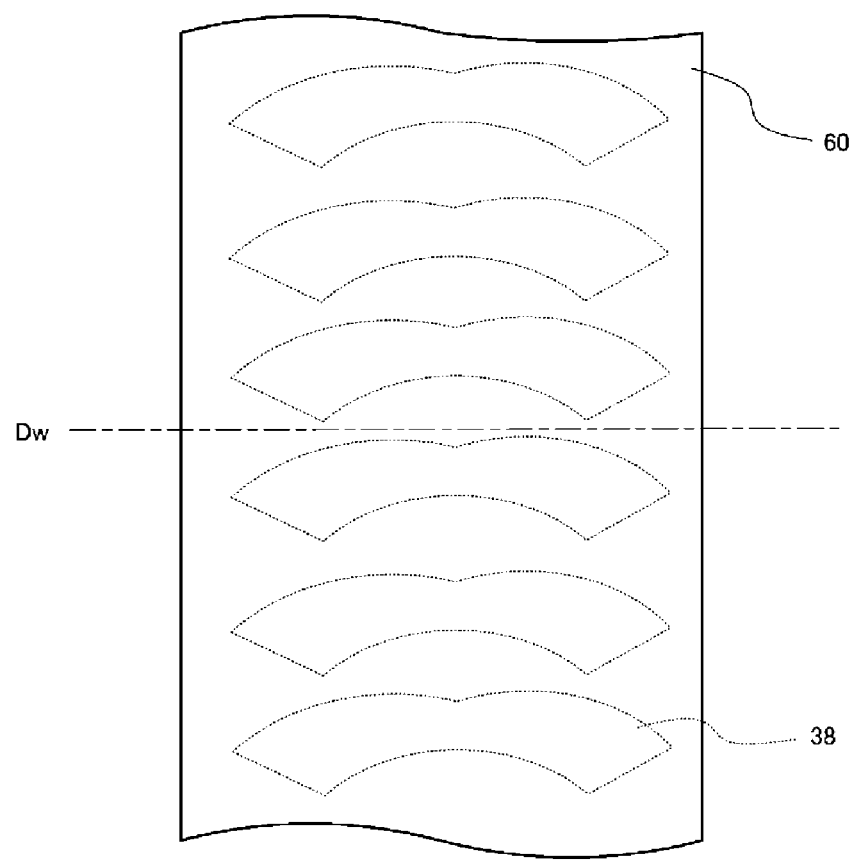
FIG. 5 is an explanatory diagram (plan view) illustrating a base cloth pattern placement of a side panel that constitutes the airbag cushion in the airbag device according to the present invention.

FIG. 5 is an explanatory diagram (plan view) illustrating a base cloth pattern of the side panel 38. The side panel 38 is formed from a strip shaped base cloth 60, and can be formed by cutting the base cloth in a direction such that the longitudinal direction of the side panel 38 is parallel to the width direction Dw of the base cloth 60.

As described above, by devising a method of cutting the side panel 38 with respect to the strip shaped base cloth 60, the base cloth 60 can be used efficiently resulting in a cost reduction. Note that the side panel 38 is composed of two panels of the same shape where these two panels are cut from the base cloth 60 and thereafter sewn together to form one side panel 38.

Figure 6:
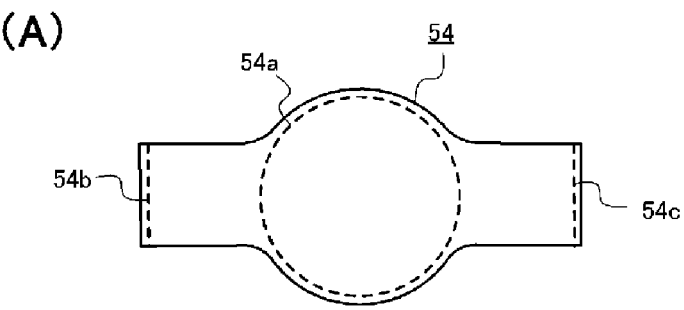
FIG. 6 is a plan view illustrating a structure of a tether used in the airbag device according to the present invention.
Figure 6:
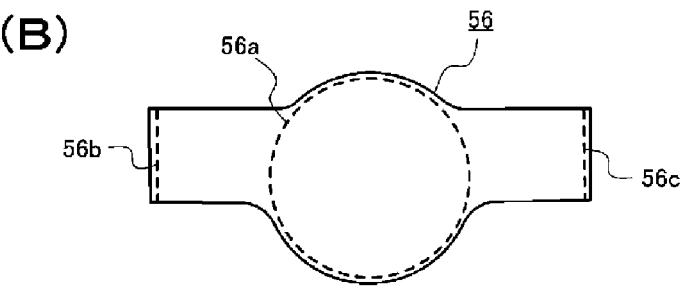

FIG. 6 is a plan view illustrating a structure of a tether 50 (see FIG. 1 and FIG. 2) attached inside the airbag cushion 16. The recessed part 40 is formed in the center 32 of the occupant side panel by the tether 50 that extends in the front-to-back direction inside the airbag cushion 16 and can connect the steering side panel 34 and the occupant side panel 32. When the airbag cushion 16 expands, the tether 50 restricts deployment of the airbag cushion 16 in the front-to-back direction and as a result, forms the recessed part 40 on the surface of the occupant side panel 32.

The tether 50 includes a first tether 54 connected to the occupant side panel 32 and a second tether 56 connected to the steering side panel 34. Referring again to FIG. 4 in addition to FIG. 6, a circular sewing line 54*a* near the center of the first tether 54 and a circular sewing line 32*b* near the center of the occupant side panel 32 are connected (sewn). On the other hand, a circular sewing line 56*a* near the center of the second tether 56 and a circular sewing line 34*b* near the center of the steering side panel 34 are connected (sewn). In addition, end parts 54*b* and 54*c* of the first tether 54 and end parts 56*b* and 56*c* of the second tether 56 are connected (sewn) together.

As illustrated in FIG. 4(A), the center position C1 of the recessed part of the occupant side panel 32 in the vertical direction is positioned higher than the center position C0 of the occupant side panel 32 in the vertical direction.

By offsetting (eccentrically), the recessed part 40 to the upper part of the occupant side panel 32, the proportion of the lower area of the airbag cushion 16 increases, enabling reliable restraint of the abdomen of the occupant X and avoiding an incident of the abdomen of the occupant X colliding with the steering wheel 12.

As described above, with the present invention, the airbag cushion 16 is formed by connecting the occupant side panel 32, the steering side panel 34, and the side panel 38, and compared to the case of connecting the occupant side panel 32 and the steering side panel 34 directly, the occupant side panel 32 has less curve (greater degree of curvature), and is closer to being a flat surface.

In addition, by forming the recessed part 40 near the center of the occupant side panel 32, the periphery of the recessed part 40 of the occupant side panel 32 is less curved (greater degree of curvature) and the surface of the occupant side panel 32 is even closer to being a flat surface.

Furthermore, by forming a substantially flat part 42 above the recessed part 40 of the occupant side panel 32 in the area that the face of the occupant comes into contact with during a vehicle crash test, the actual surface area that is in contact with the face of the occupant X increases, suppressing rotation of the head of the occupant upon entering into the airbag cushion 16, and enabling reliably restraining the head of the occupant.

In addition, enlarging the width D2 of the upper end part more than the width D1 of the lower end part of the side panel 38 causes the upper part (12 o'clock side) of the occupant side panel 32 of the expanded and deployed airbag cushion 16 to be inclined toward the occupant X. Here, a surface parallel to the rim of the steering wheel 12 was normally inclined away from the occupant X (toward the front of the vehicle) by roughly 20° from vertical but inclining the occupant side panel 32 toward the occupant X enables the flat part 42 of the occupant side panel 32 to be close to vertical, increasing the contact surface area with the face of the occupant X.

Figure 7:
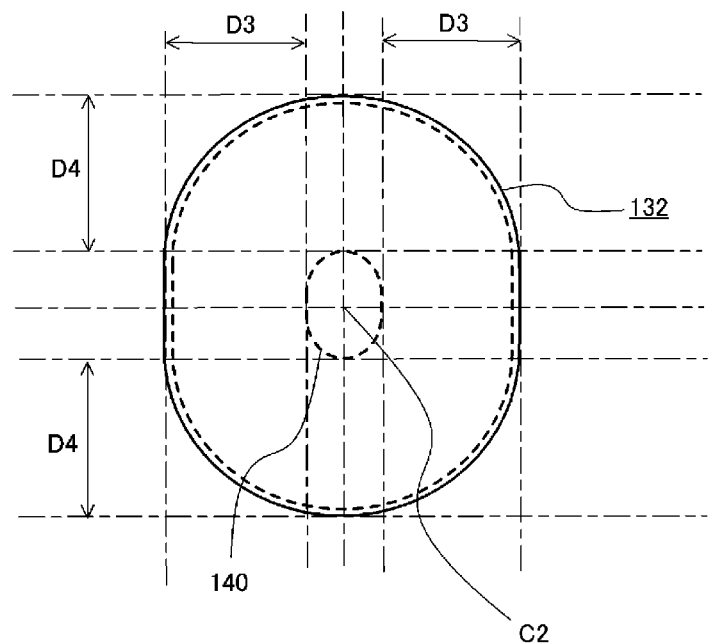
FIG. 7 is a plan view illustrating the positional relationship of a recessed part and the airbag cushion occupant side panel for the airbag device according to another aspect of the present invention.

FIG. 7 is a plan view illustrating the positional relationship of an occupant side panel 132 and a recessed part 140 of another aspect of the present invention. In the occupant side panel 132, a horizontal (lateral direction) distance D3 from a left-right end part in the center in the vertical direction of the recessed part 140 to a left-right end part of the occupant side panel 132 can be formed substantially equal to a vertical (longitudinal direction) distance D4 from the up-down end part in the center in the left-right direction of the recessed part 140 to the up-down end part of the occupant side panel 132. From another point of view, the outer peripheral shape of the recessed part 140 can be set similar to the outer peripheral shape of the occupant side panel 132.

By arranging the recessed part 140 in the center C2 of the occupant side panel 132 in this manner, gas spreads uniformly inside the airbag cushion 16 enabling a stabilized deployment shape and deployment behavior of the airbag cushion 16.

Figure 8:
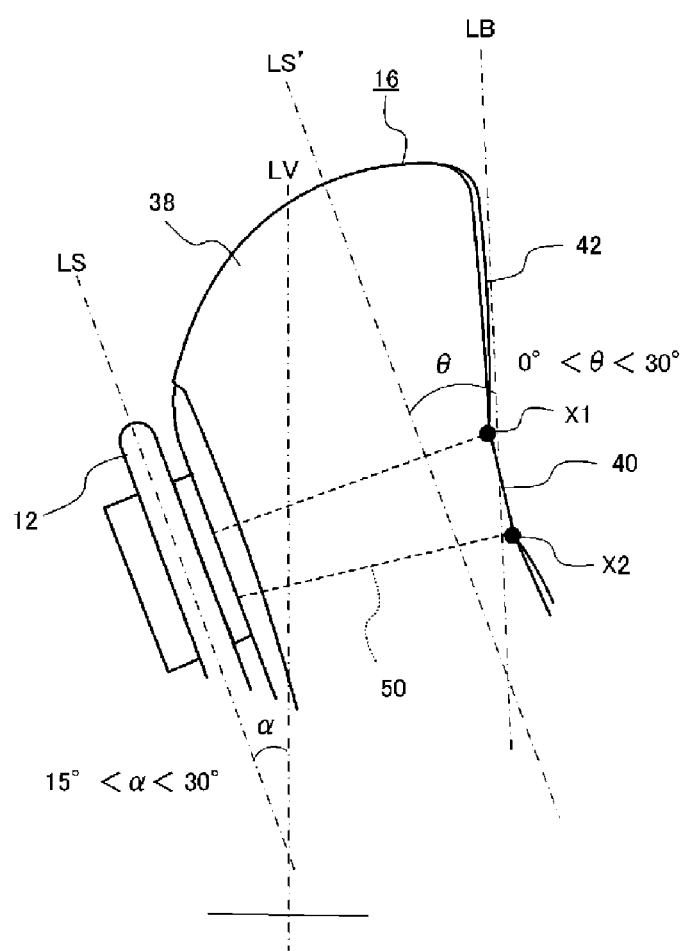
FIG. 8 is a partial side view illustrating a deployed shape of the airbag cushion according to the present invention.

FIG. 8 is a partial side view illustrating a deployed shape of the airbag cushion 16 according to the present invention. As illustrated in FIG. 8, when viewed from the side, the steering wheel 12 is attached such that a line LS along the rim surface of the steering wheel 12 is inclined in a direction tilted to 30° to the front (left side in figure) relative to vertical LV.

In addition, the configuration enables a line LB connecting the upper end and the lower end of the flat part 42 of the airbag 16 to be inclined 0° to 30° relative to the line LS parallel to the steering wheel 12 rim surface in the direction (rightward direction in figure) approaching the head of the occupant.

As described above, the steering wheel 12 is attached in a typical vehicle in a state of being tilted forward with respect to vertical and the airbag cushion 16 deploys in a direction substantially perpendicular relative to the steering wheel 12 rim surface. In the present embodiment, inclining the occupant side panel 32 in the direction of approaching the head of the occupant enables setting the flat part 42 of the occupant side panel in a state closer to vertical (upright). As a result, the head (face) of the occupant comes into contact with the flat part 42 of the airbag cushion 16 over a larger surface area.

Here, the amount of inclination (angle) of the flat part 42 can be adjusted by changing the length of the tether 50 in the front-to-back direction. With the present invention, a recessed part 40 near the center of the occupant side panel 32 can be formed by setting the length of the tether 50 in the front-to-back direction smaller than the width of the side panel 38. The shorter the length of the tether 50, the deeper the recessed part 40, resulting in higher inclination of the flat part 42 formed in the upper part of the occupant side panel 32 in the direction of tilting to the occupant side relative to vertical. On the other hand, this deepens the recessed part 40 so the lower portion of the occupant side panel 32 will be drastically inclined relative to vertical toward the occupant.

In viewing the change for the case of deepening the recessed part 40 on paper in FIG. 8, the upper portion (flat part 42) inclines so as to rotate clockwise with a connecting part X1 of the occupant side panel 32 and the tether 50 as base points more than the recessed part 40 of the occupant side panel 32. On the other hand, the portion below the recessed part 40 is inclined so as to rotate counterclockwise with a connection part X2 of the occupant side panel 32 and the tether 50 as base points.

Embodiments of the present invention have been described above. However, the present invention is in no way limited by these embodiments and may be changed within a scope of technical ideas set forth in the patent claims.

The invention claimed is:

1. An airbag device installed in a steering wheel of a vehicle, comprising:
   a gas generator secured to the steering wheel for generating expansion gas; and
   an airbag cushion that is expanded and deployed toward an occupant side by the expansion gas, the airbag cushion including:
      an occupant side panel configured to face an occupant when expanded and deployed;
      a steering side panel that is opposite the occupant side panel; and
      a side panel that connects the occupant side panel and the steering side panel at an outer edge of the occupant side panel and the steering side panel, wherein the side panel is formed as a single elongated panel with both ends of the side panel connected together at an upper end of the airbag cushion, wherein, when the airbag cushion is in an expanded and deployed state, a width in a front-to-back direction of an upper edge portion of the airbag cushion is greater than a width in the front-to-back direction of a lower edge portion of the airbag cushion; and
   a tether extending in the front-to-back direction inside the airbag cushion to connect the steering side panel and the occupant side panel, wherein the tether forms a recessed part near a center of the occupant side panel when the airbag cushion is in the expanded and deployed state, and wherein a substantially flat part is formed in an area above the recessed part of the occupant side panel and is configured to come into contact with a face of the occupant, wherein a length of the tether causes the substantially flat part to be substantially vertical when the airbag cushion is in the expanded state.

2. The airbag device according to claim 1, wherein the expanded and deployed airbag cushion is configured to receive the face of the occupant with the substantially flat part substantially parallel to the face of the occupant.

3. The airbag device according to claim 1, wherein the substantially flat part is formed so that in a vehicle crash test, the entirety of a flat portion of a face of a THOR dummy AM50 comes into contact with the occupant side panel at the same time.

4. The airbag device according to claim 1, wherein when the steering wheel is viewed from a side, a line LS parallel to a surface of a rim of the steering wheel is tilted to a front of the vehicle by 15° to 30° relative to vertical.

5. The airbag device according to claim 1, wherein when the airbag cushion in a deployed state is viewed from a side, a line LB connecting an upper end and a lower end of the substantially flat part is tilted 0° to 30° in a direction away from a line LS' parallel to a rim surface of the steering wheel.

6. The airbag device according to claim 1, wherein the tether is connected along a circular or elliptical shape sewing line near the center of the occupant side panel.

7. The airbag device according to claim 1, wherein a center position C1 in a vertical direction of the recessed part is positioned above a center position C0 in a vertical direction of the occupant side panel.

8. The airbag device according to claim 1, wherein an upper end part of the recessed part of the expanded and deployed airbag cushion is configured to be positioned near a jaw of the occupant.

9. The airbag device according to claim 1, wherein a horizontal distance D3 from a right lateral edge of the recessed part to a right lateral edge of the occupant side panel is substantially equal to a vertical distance D4 from an uppermost edge of the recessed part to an uppermost edge of the occupant side panel.

10. The airbag device according to claim 1, wherein an outer peripheral shape of the recessed part as viewed from the occupant side is similar to an outer peripheral shape of the occupant side panel.

11. An airbag cushion comprising:
   an occupant side panel configured to face an occupant when expanded and deployed;
   a steering side panel that is opposite the occupant side panel; and
   a side panel that connects the occupant side panel and the steering side panel at an outer edge of the occupant side panel and the steering side panel, wherein the side panel is formed as a single elongated panel with both ends of the side panel connected together at an upper end of the airbag cushion, wherein, when the airbag cushion is in an expanded and deployed state, a width in a front-to-back direction of an upper edge portion of the airbag cushion is greater than a width in the front-to-back direction of a lower edge portion of the airbag cushion; and
   a tether extending in the front-to-back direction inside the airbag cushion to connect the steering side panel and the occupant side panel, wherein the tether is connected along a circular or elliptical shape sewing line near a center of the occupant side panel, wherein the tether forms a recessed part near the center of the occupant side panel when the airbag cushion is in the expanded and deployed state, and wherein a substantially flat part is formed in an area above the recessed part of the occupant side panel and is configured to come into contact with a face of the occupant, wherein a length of the tether causes the substantially flat part to be substantially vertical when the airbag cushion is in the expanded and deployed state.

* * * * *